United States Patent [19]
Bialick et al.

[11] Patent Number: 6,088,802
[45] Date of Patent: Jul. 11, 2000

[54] PERIPHERAL DEVICE WITH INTEGRATED SECURITY FUNCTIONALITY

[75] Inventors: William P. Bialick, Clarksville, Md.; Mark J. Sutherland, Milpitas, Calif.; Janet L. Dolphin-Peterson, Belvedere, Calif.; Thomas K. Rowland, Los Gatos, Calif.; Kirk W. Skeba, Fremont, Calif.; Russell D. Housley, Herndon, Va.

[73] Assignee: Spyrus, Inc., Santa Clara, Calif.

[21] Appl. No.: 08/869,305

[22] Filed: Jun. 4, 1997

[51] Int. Cl.[7] .................................................. G06K 14/67
[52] U.S. Cl. ........................... 713/200; 713/201; 713/202
[58] Field of Search ........................ 395/188.01, 187.01, 395/186; 380/4, 25, 49; 713/200, 201, 202

[56] References Cited

U.S. PATENT DOCUMENTS

| | | | |
|---|---|---|---|
| 4,709,136 | 11/1987 | Watanabe | 235/379 |
| 4,910,776 | 3/1990 | Dyke | 380/25 |
| 5,191,611 | 3/1993 | Lang | 380/25 |
| 5,282,247 | 1/1994 | McLean et al. | 380/4 |
| 5,297,206 | 3/1994 | Orton | 380/30 |
| 5,442,704 | 8/1995 | Holtey | 380/23 |
| 5,457,590 | 10/1995 | Barrett et al. | 360/133 |
| 5,473,692 | 12/1995 | Davis | 380/25 |
| 5,491,827 | 2/1996 | Holtey | 395/800 |
| 5,524,134 | 6/1996 | Gustafson et al. | 379/58 |
| 5,537,544 | 7/1996 | Morisawa et al. | 395/188.01 |
| 5,546,463 | 8/1996 | Caputo et al. | 380/25 |
| 5,548,721 | 8/1996 | Denslow | 395/187.01 |
| 5,610,981 | 3/1997 | Mooney et al. | 380/25 |
| 5,630,174 | 5/1997 | Stone, III et al. | 395/883 |
| 5,640,302 | 6/1997 | Kikinis | 361/687 |
| 5,694,335 | 12/1997 | Hollenberg | 364/514 |
| 5,742,683 | 4/1998 | Lee et al. | 380/23 |
| 5,770,849 | 6/1998 | Novis et al. | 235/492 |
| 5,790,674 | 8/1998 | Houvener et al. | 380/23 |
| 5,828,832 | 10/1998 | Holden et al. | 395/187.01 |
| 5,878,142 | 3/1999 | Caputo et al. | 380/25 |

FOREIGN PATENT DOCUMENTS

| | | |
|---|---|---|
| WO 82/03286 | 9/1982 | WIPO . |
| WO 97/29416 | 8/1997 | WIPO . |

OTHER PUBLICATIONS

U.S. application No. 08/869,120, Bialick et al., filed Jun. 4, 1997, pending.

*Primary Examiner*—Ly V. Hua
*Attorney, Agent, or Firm*—David R. Graham

[57] ABSTRACT

The invention enables a peripheral device to communicate with a host computing device to enable one or more security operations to be performed by the peripheral device on data stored within the host computing device, data provided from the host computing device to the peripheral device (which can then be, for example, stored in the peripheral device or transmitted to yet another device), or data retrieved by the host computing device from the peripheral device (e.g., data that has been stored in the peripheral device, transmitted to the peripheral device from another device or input to the peripheral device by a person). In particular, the peripheral device can be adapted to enable, in a single integral peripheral device, performance of one or more security operations on data, and a defined interaction with a host computing device that has not previously been integrated with security operations in a single integral device. The defined interactions can provide a variety of types of functionality (e.g., data storage, data communication, data input and output, user identification). The peripheral device can also be implemented so that the security operations are performed in-line, i.e., the security operations are performed between the communication of data to or from the host computing device and the performance of the defined interaction. Moreover, the peripheral device can be implemented so that the security functionality of the peripheral device is transparent to the host computing device.

39 Claims, 9 Drawing Sheets

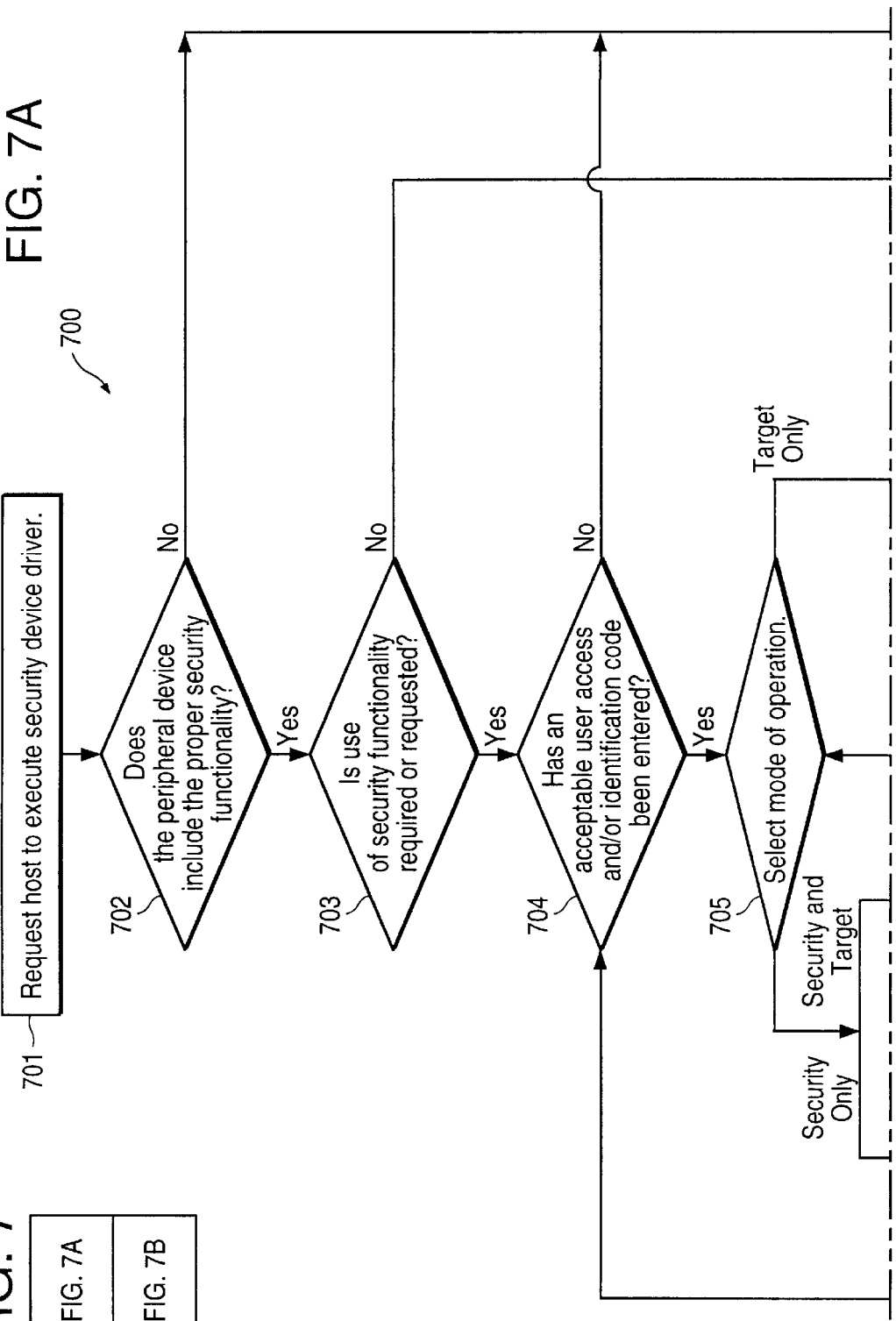

PERIPHERAL DEVICE WITH INTEGRATED SECURITY FUNCTIONALITY

CROSS-REFERENCE TO RELATED APPLICATION

This application is related to the commonly owned, co-pending United States patent Application entitled "Modular Security Device," by William P. Bialick, Mark J. Sutherland, Janet L. Dolphin-Peterson, Thomas K. Rowland, Kirk W. Skeba and Russell D. Housley, filed on the same date as the present application and having Attorney Docket No. SPY-003, the disclosure of which is incorporated by reference herein.

BACKGROUND OF THE INVENTION

1. Field of the Invention

This invention relates to a peripheral, often portable, device (as well as the methods employed by such a peripheral device, and systems including such a peripheral device and a host computing device with which the peripheral device communicates) that can communicate with a host computing device to enable one or more security operations to be performed by the peripheral device on data stored within the host computing device, data provided from the host computing device to the peripheral device, or data retrieved by the host computing device from the peripheral device.

2. Related Art

Computing capability is becoming increasingly portable. In particular, there are more and more portable peripheral devices that are adapted for communication with a host computing device (e.g., desktop computer, notebook computer or personal digital assistant) to enable particular functionality to be achieved. These portable peripheral devices can take a variety of physical forms (e.g., PCMCIA cards, smart cards, CD-ROMs) and can perform an assortment of functions (e.g., storage, communications and cryptography).

However, while portable computing affords a number of advantages, it has a significant disadvantage in that the computational environment (including the portable peripheral devices, the host computing devices in which they are used, and any other computational devices that communicate with those devices) is more susceptible to security breaches, i.e., unauthorized access to, or modification of, programs and/or data resident within the environment. Consequently, cryptographic devices and methods have been developed for use with such computational environments (as well as other computational environments) to enable increased levels of environment security to be obtained.

FIG. 1 is a block diagram of a prior art system for enabling a host computing device to provide secured data to, and retrieve secured data from, a portable device. In FIG. 1, a system 100 includes a host computing device 101 and a portable device 102. The host computing device 101 and portable device 102 are adapted to enable communication between the devices 101 and 102. The host computing device 101 includes a security mechanism 101a (which can be embodied by appropriately configured hardware, software and/or firmware, such as, for example, a general purpose microprocessor operating in accordance with instructions of one or more computer programs stored in a data storage device such as a hard disk) which can be directed to perform one or more cryptographic operations.

In the system 100, if it is desired to provide secured data from the host computing device 101 to the portable device 102, the host computing device 101 causes the security mechanism 101a to perform appropriate cryptographic operations on data before the data is transferred to the portable device 102. Similarly, the host computing device 101 can receive secured data from the portable device 102 and perform appropriate cryptographic operations on the data to convert the data into a form that enables the data to be accessed and/or modified by a person who is authorized to do so.

A significant deficiency of the system 100 is that the security mechanism 101a is itself typically not adequately secure. It is commonly accepted that the components (including hardware, software and/or firmware) of most host computing devices are inherently insecure. This is because the system design of host computing devices is, typically, intentionally made open so that components made by different manufacturers can work together seamlessly. Thus, an unauthorized person may obtain knowledge of the operation of the security mechanism 101a (e.g., identify a cryptographic key), thereby enabling that person to gain access to, and/or modify, the (thought to be secured) data.

FIG. 2 is a block diagram of another prior art system for enabling a host computing device to provide secured data to, and retrieve secured data from, a portable device. In FIG. 2, a system 200 includes a host computing device 201, a portable device 202 and a security device 203. The host computing device 201, the portable device 202 and security device 203 are adapted to enable communication between the devices 201 and 202, and between the devices 201 and 203. The security device 203 includes appropriately configured hardware, software and/or firmware which can be directed to perform one or more cryptographic operations.

In the system 200, if it is desired to provide secured data from the host computing device 201 to the portable device 202, the host computing device 201 first causes data to be transferred to the security device 203, where appropriate cryptographic operations are performed on the data. The secured data is then transferred back to the host computing device 201, which, in turn, transfers the secured data to the portable device 202. Similarly, the host computing device 201 can receive secured data from the portable device 202 by, upon receipt of secured data, transferring the secured data to the security device 203, which performs appropriate cryptographic operations on the data to convert the data into a form that enables the data to be accessed and/or modified by a person who is authorized to do so, then transfers the unsecured data back to the host computing device 201.

The system 200 can overcome the problem with the system 100 identified above. The security device 203 can be constructed so that the cryptographic functionality of the device 203 can itself be made secure. (Such a security device is often referred to as a security "token.") An unauthorized person can therefore be prevented (or, at least, significantly deterred) from obtaining knowledge of the operation of the security device 203, thereby preventing (or significantly deterring) that person from gaining access to, and/or modifying, the secured data.

However, the system 200 may still not always ensure adequately secured data. In particular, unsecured data may be provided by the host computing device 201 to the portable device 202 if the host computing device 201— whether through inadvertent error or deliberate attack by a user of the host computing device 201, or through malfunction of the host computing device 201—fails to first transfer data to the security device 203 for appropriate cryptographic treatment before providing the data to the portable device 202.

Additionally, the system 200 requires the use of two separate peripheral devices (portable device 202 and security device 203) to enable the host computing device 201 to exchange secured data with the portable device 202. For several reasons, this may be inconvenient. First, both devices 202 and 203 may not be available at the time that it is desired to perform a secure data exchange (e.g., one may have been forgotten or misplaced). Second, even if both devices 202 and 203 are available, it may not be possible to connect both devices 202 and 203 at the same time to the host computing device 201, making use of the devices 202 and 203 cumbersome and increasing the likelihood that unsecured data is provided by the host computing device 201 to the portable device 202.

SUMMARY OF THE INVENTION

A peripheral device according to the invention can be used to communicate with a host computing device to enable one or more security operations to be performed by the peripheral device on data stored within the host computing device, data provided from the host computing device to the peripheral device (which can then be, for example, stored in the peripheral device or transmitted to yet another device) or data retrieved by the host computing device from the peripheral device (e.g., data that has been stored in the peripheral device, transmitted to the peripheral device from another device or input to the peripheral device by a person). In particular, the peripheral device can be adapted to enable, in a single integral peripheral device, performance of one or more security operations on data, and a defined interaction with a host computing device that has not previously been integrated with security operations in a single integral device. The defined interactions can provide a variety of types of functionality (e.g., data storage, data communication, data input and output, user identification), as described further below. The peripheral device can be implemented so that the peripheral device can be operated in any one of multiple user-selectable modes: a security functionality only mode, a target functionality mode, and a combined security and target functionality mode. The peripheral device can also be implemented so that the security operations are performed in-line, i.e., the security operations are performed between the communication of data to or from the host computing device and the performance of the defined interaction. Moreover, the peripheral device can be implemented so that the security functionality of the peripheral device is transparent to the host computing device.

A peripheral device according to the invention can advantageously enable application of security operations to a wide variety of interactions with a host computing device. In particular, a peripheral device according to the invention can accomplish this without necessity to use two peripheral devices: one that performs the security operations and one that performs the defined interaction. This can, for example, minimize the possibility that the device adapted to perform the defined interaction will be used with the host computing system without proper application of security operations to that interaction. Moreover, the provision of in-line security in a peripheral device according to the invention enables a more secure exchange of data between a host computing device and the peripheral device, overcoming the problems identified above in previous systems for performing security operations on data exchanged between such devices. Additionally, implementing a modular device according to the invention so that the performance of security operations by the modular device is transparent can reduce or eliminate the need to modify aspects of the operation of the host computing device (e.g., device drivers of the host computing device), making implementation and use of a data security system including the modular device simpler and easier. Thus, the possibility that a user will use the system incorrectly (e.g., fail to apply security operations to an interaction with the host computing device, or apply the security operations incorrectly or incompletely) is reduced. Making the security operations transparent can also enhance the security of those operations.

BRIEF DESCRIPTION OF THE DRAWINGS

FIGS. 7A and 7B is a flow chart of a method, according to an embodiment of the invention, for using a peripheral device according to the invention.

DETAILED DESCRIPTION OF THE INVENTION

Figure 1:
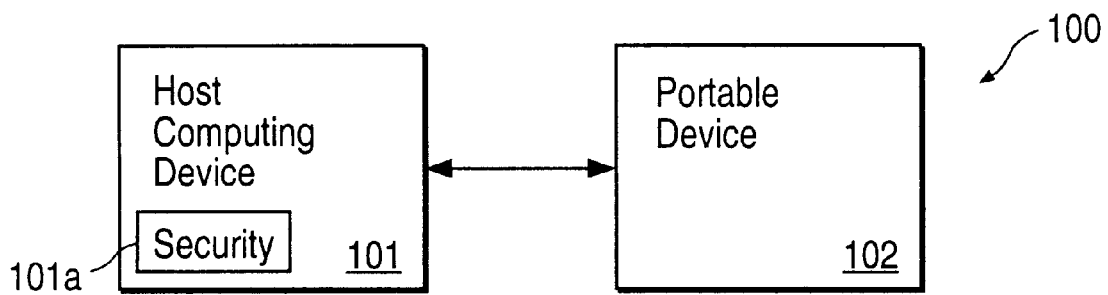
FIG. 1 is a block diagram of a prior art system for enabling a host computing device to provide secured data to, and retrieve secured data from, a portable device.
Figure 2:
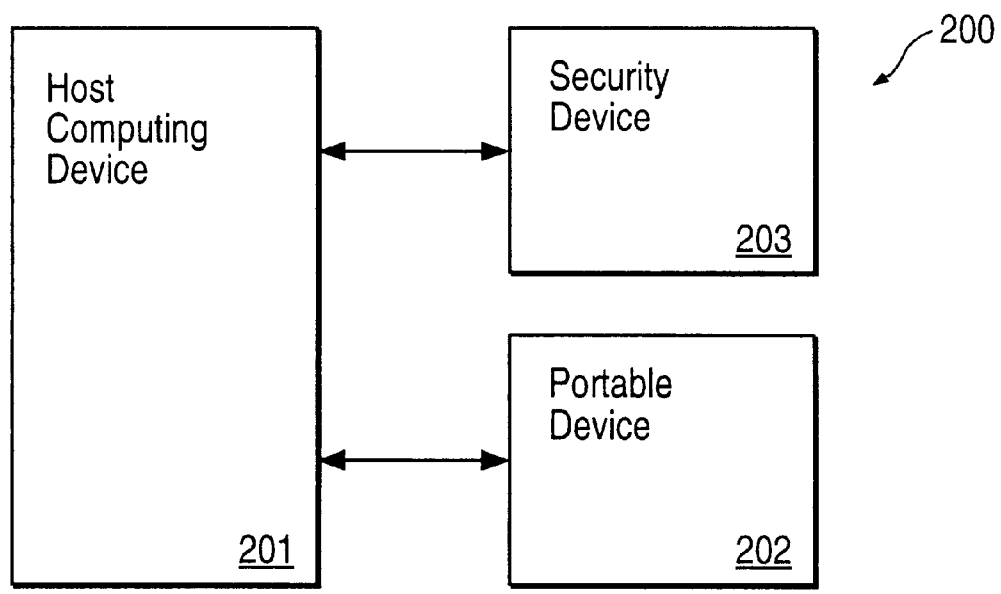
FIG. 2 is a block diagram of another prior art system for enabling a host computing device to provide secured data to, and retrieve secured data from, a portable device.
Figure 3A:
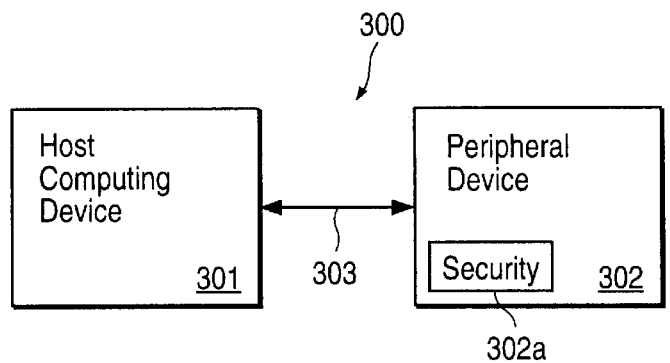
FIG. 3A is a block diagram of a system according to the invention.

FIG. 3A is a block diagram of a system 300 according to the invention. The system 300 includes a host computing device 301 and a peripheral device 302 that communicate via a communications interface 303. Herein, "peripheral device" can refer to any device that operates outside of a host computing device and that is connected to the host computing device. The peripheral device 302 includes a security mechanism 302a that enables security operations (examples of which are described in more detail below) to be performed on data that is stored within the host computing device 301, data that is transmitted from the host computing device 301 to the peripheral device 302, or data that is transmitted from the peripheral device to the host computing device 301. As explained in more detail below, the peripheral device 302 also provides additional functionality (referred to herein as "target functionality") to the system 300, such as, for example, the capability to store data in a solid-state disk storage device, the capability to enable communications from the host computing device 301 to another device, the capability to accept biometric input to enable user authentication to the host computing device 301, and the capability to receive and read a smart card inserted into the peripheral device 302.

Generally, the communications interface 303 can be any embodied by any of a variety of communication interfaces, such as a wireless communications interface, a PCMCIA interface, a smart card interface, a serial interface (such as an RS-232 interface), a parallel interface, a SCSI interface or an IDE interface. Each embodiment of the communications interface 303 includes hardware present in each of the host computing device 301 and peripheral device 302 that operates in accordance with a communications protocol (which can be embodied, for example, by software stored in a memory device and/or firmware that is present in the host computing device 301 and/or peripheral device 302) appropriate for that type of communications interface, as known to those skilled in the art. Each embodiment of the communications interface 303 also includes mechanisms to enable physical engagement, if any, between the host computing device 301 and peripheral device 302.

Generally, the security mechanism 302a can be configured to perform any electronic data security operation (herein, referred to simply as "security operation") including, for example, operations that provide one or more of the basic cryptographic functions, such as maintenance of data confidentiality, verification of data integrity, user authentication and user non-repudiation. Particular security operations that can be implemented in a peripheral device according to the invention are described in more detail below.

The security mechanism 302a can be, for example, embodied as a security token. Herein, "security token" refers to a device that performs security operations and that includes one or more mechanisms (such as, for example, use of a hardware random number generator and/or protected memory) to provide security for the content of those operations.

Figure 3B:
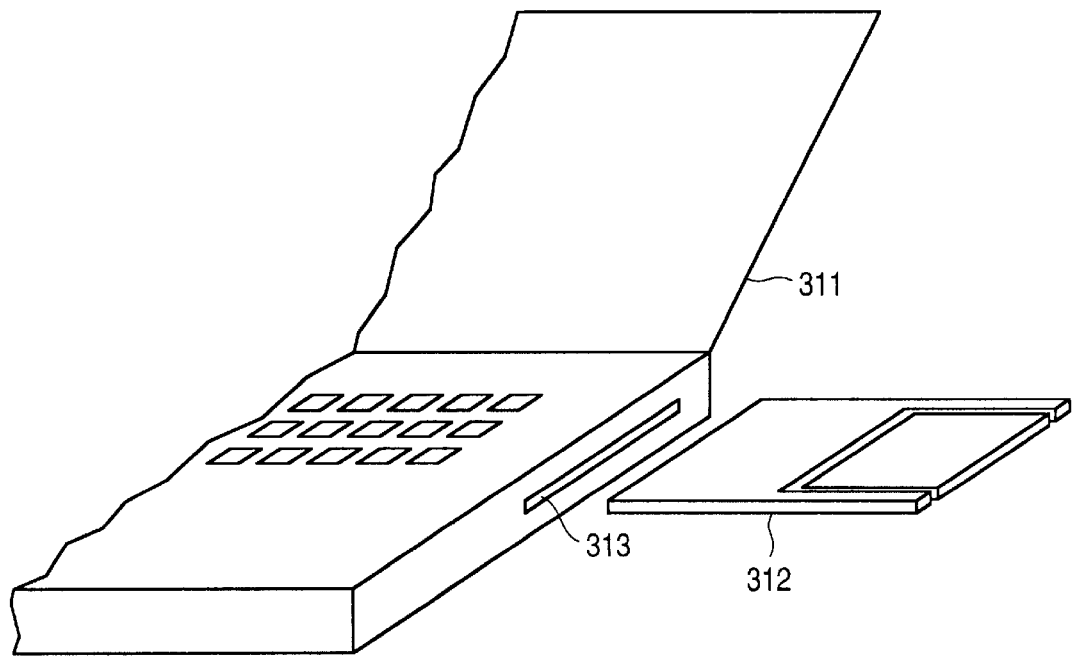
FIG. 3B is a perspective view of a physical implementation of the system of FIG. 3A according to one embodiment of the invention.

FIG. 3B is a perspective view of a physical implementation of the system 300 of FIG. 3A, according to one embodiment of the invention. In FIG. 3B, the peripheral device 302 is embodied as a card 312 that can be inserted into a corresponding slot 313 formed in a portable computer 311 that, in FIG. 3B, embodies the host computing device 301. Often a peripheral device according to the invention is a portable device, such as the card 312 shown in FIG. 3B. Herein, "portable device" can refer generally to any device that is capable of being easily carried by hand.

Figure 4:
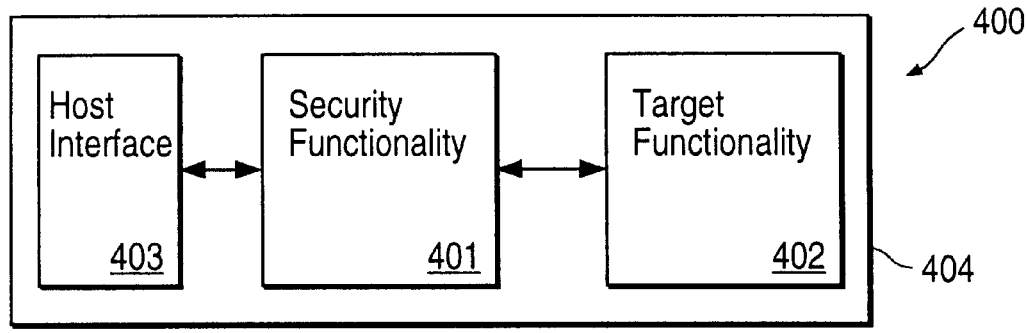
FIG. 4 is a block diagram of a peripheral device according to an embodiment of the invention.

FIG. 4 is a block diagram of a peripheral device 400 according to an embodiment of the invention. The peripheral device 400 includes security functionality 401, target functionality 402 and a host interface 403 that are formed together as part of a single physical device. For example, the security functionality 401 and target functionality 402 can be enclosed in a single, card-like housing (designated in FIG. 4 by the numeral 404) conforming to a PCMCIA card or smart card standard.

The peripheral device 400 can have a number of advantageous characteristics. The peripheral device 400 can be implemented in a manner that enables the security operations of the security functionality 401 to be performed in a manner that is transparent to a host computing device (and, depending upon the particular implementation of the peripheral device 400, to a user of a system including the peripheral device 400) of a system according to the invention, so that the host computing device (and, perhaps, user) is aware only of the presence of the target functionality 402. Additionally, the peripheral device 400 can be implemented so that security operations are performed "in-line," i.e., the security operations are performed between the communication of data to or from the host computing device and the performance of the target functionality provided by the peripheral device. Further, the peripheral device 400 enables a wide variety of secure target functionality to be easily provided to a host computing device.

Figure 5:
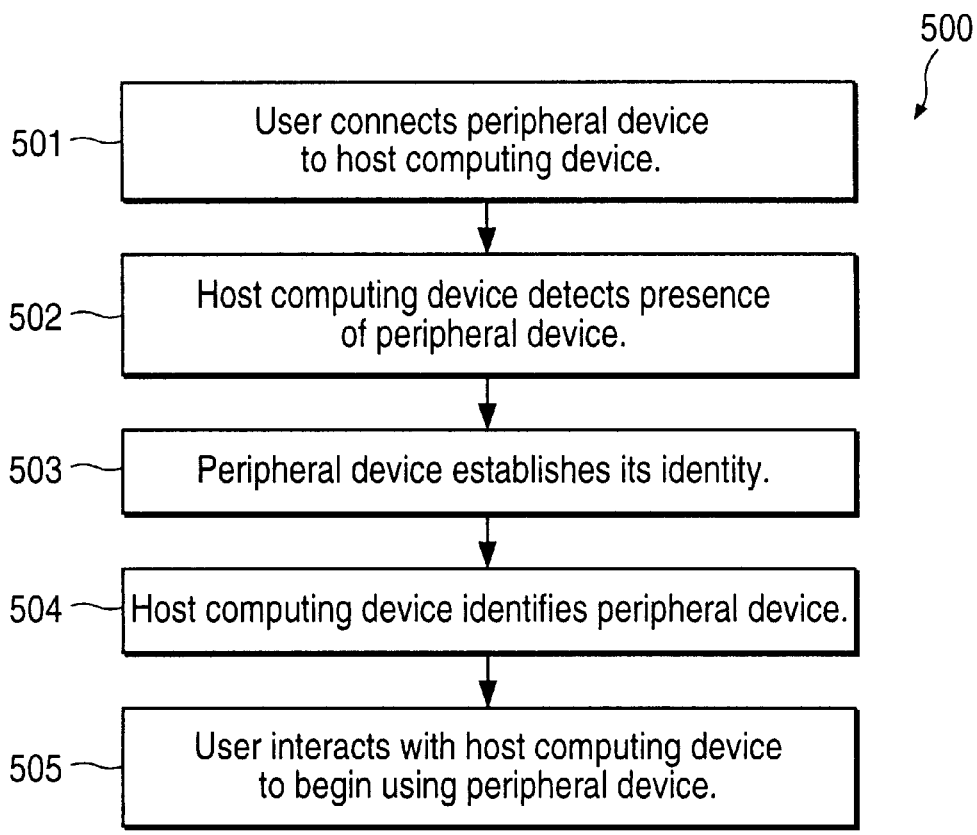
FIG. 5 is a flow chart of a method, according to an embodiment of the invention, for initiating use of a system according to the invention.

FIG. 5 is a flow chart of a method 500, according to an embodiment of the invention, for initiating use of a system according to the invention. The method 500 enables an aspect of the invention in which the presence of security functionality as part of a peripheral device is not detected by a host computing device, thus making the security functionality transparent to the host computing device and, depending upon the particular manner in which the security functionality is implemented, to a user of the system.

Figure 6:
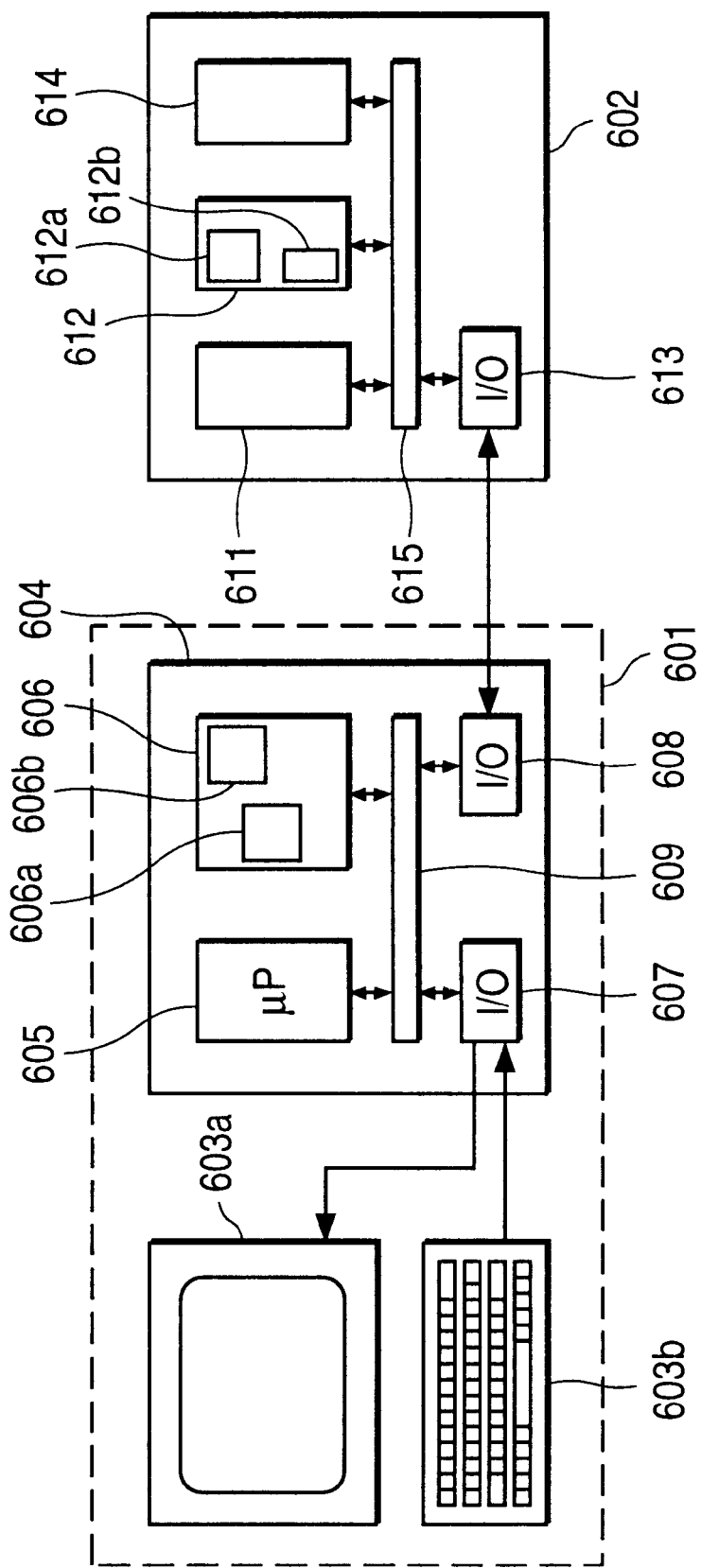
FIG. 6 is a block diagram of a system, according to an embodiment of the invention, illustrating operation of the system during a method according to the invention as in FIG. 5.

FIG. 6 is a block diagram of a system 600, according to an embodiment of the invention, illustrating operation of the system 600 during a method according to the invention such as the method 500 of FIG. 5. The system 600 includes a host computing device 601 and a peripheral device 602. The host computing device 601 includes a display device 603a (e.g., a conventional computer display monitor) and user input device 603b (e.g., a keyboard, mouse, trackball, joystick or other appropriate device), referred to collectively hereinafter as user interface device 603. The host computing device 601 also includes, mounted within a housing 604, a processing device 605, a memory device 606, an input/output (I/O) device 607 for enabling communication with the user interface device 603, and an input/output (I/O) device 608 for enabling communication with peripheral device 602. The devices 605, 606, 607 and 608 can each be implemented by conventional such devices and can communicate with each other via a conventional computer bus 609, as is well known and understood. The peripheral device 602 includes security functionality 611, a memory device 612, an input/output (I/O) device 613 for enabling communication with the host computing device 601 and target functionality 614. The security functionality 611, memory device 612, I/O device 613 and target functionality 614 can each be implemented by conventional devices and can communicate with each other via a conventional computer bus 615, as is well known and understood. The host computing device 601 and the peripheral device 602 are shown in simplified form in FIG. 6 to facilitate clarity in illustration of this aspect of the invention; as described in more detail below and as understood by those skilled in the art, the host computing device 601 and the peripheral device 602 can—and typically will—include other devices not shown in FIG. 6.

Returning to FIG. 5, use of a system according to the invention begins when, as shown by step 501, a user of the system connects a peripheral device according to the invention to a host computing device. Such connection can occur in any manner that enables the peripheral device to communicate with the host computing device. Frequently, this will occur as a result of a physical connection of the peripheral device to the host computing device. (In general, such physical connection can occur either before or after the host computing device begins operating; however, in the former case, subsequent steps of the method 500—with the exception of, depending upon the implementation of the peripheral device, the step 503—cannot be performed until the host computing device begins operating.) For example, the peripheral device can be embodied in a card or disk (e.g., a card conforming to a PCMCIA form factor as established by the appropriate standard) that is inserted into a corresponding socket formed in the host computing device. Or, the peripheral device can be embodied in a housing from which a cord extends, a plug of the cord being inserted into a mating receptacle formed in the host computing device. However, such physical connection need not necessarily occur; the peripheral device can also be connected to the host computing device by any type of wireless communication for which the host computing device contains an appropriate interface.

Once connection between the peripheral device and the host computing device is made, the host computing device detects the presence of the peripheral device, as shown by step 502. Such detection of the presence of a peripheral device is typically enabled as a standard aspect of the operating system software of the host computing device.

Typically, once the presence of a new peripheral device is detected by the operating system software of the host computing device, the operating system software (or companion software program) also identifies the type of the peripheral device. This can be accomplished, for example, by a standard software device driver (hereinafter, "host driver") for devices of the type that use the host computing device interface that is being used by the peripheral device 602. In FIG. 6, the host driver is shown stored in the memory section 606*a* of the memory device 606 of the host computing device 601. (The Card Services or Socket Services programs that often are bundled with the Windows95™ operating system software for use in performing various "housekeeping" functions associated with a PCMCIA interface are examples of such drivers.) However, in the method 500, before the operating system software can perform such identification, the peripheral device according to the invention suspends operation of this aspect of the operating system software, so that the peripheral device can establish its identity, as shown by step 503, and explained further below. As will be apparent from that explanation, performance of the step 503 advantageously enables the peripheral device to assume the identity of the target functionality that is part of the peripheral device. Since, as described elsewhere herein, a peripheral device according to the invention can include a variety of types of target functionality, the peripheral device can take a variety of identities.

The particular manner in which operation of the operating system software is suspended so that the peripheral device can establish its identity can depend on the characteristics of the operating system software and/or the device interface. However, for many combinations of operating system software and device interface, the operating system software waits for confirmation that the device connected to the device interface is ready for further interaction with the operating system software before the operating system software seeks to identify the type of the device connected to the interface (the standard for PCMCIA interfaces, for example, specifies such operation). In such cases, the peripheral device can be configured to delay informing the operating system software that the peripheral device is ready for further interaction until the peripheral device has established its identity.

The following description of one way in which the step 503 can be implemented can best be understood by reference to the system 600 shown in FIG. 6. One way in which the operating system software of a host computing device can identify the type of a peripheral device is to access a known memory section of a memory device of the peripheral device, as established by an interface standard developed for that type of peripheral device, that stores data representing the type of the peripheral device. This is true for a variety of types of peripheral devices, such as, for example, peripheral devices that conform to the PCMCIA standard. (The PCMCIA standard, for example, includes a specification, called the Card Information Structure, that defines, among other things, a location in a portion of memory of a PCMCIA card, denoted as "attribute memory", that stores data identifying the type of the PCMCIA card.) In the system 600, the peripheral device 602 is such a device. The memory section of the memory device 612 of the peripheral device 602 which the host computing device 601 seeks to access is shown in FIG. 6 as the memory section 612*a*, and the data stored therein is referred to herein as "peripheral device identification data."

The peripheral device 602 can be implemented so that the peripheral device 602 assumes the identity of the target functionality 614 (whether or not the security functionality of the peripheral device is also being used). This enables the host computing device 601 to interact with the peripheral device 602 as though the peripheral device 602 were a device of the type of the target functionality 614, without recognizing that security functionality 611 is present that may be performing security operations. Thus, the need to modify aspects of the operation of the host computing device (e.g., the host device driver) to enable performance of security operations is reduced or eliminated, making implementation and use of a data security system including the peripheral device 602 simpler and easier. Since use of the data security system is easier (e.g., a user need not provide input to cause the host driver to be appropriately tailored to enable desired interaction with a security device), the possibility that a user will use the system incorrectly (e.g., fail to apply security operations to an interaction with the host computing device, or apply the security operations incorrectly or incompletely) is reduced.

Though, as shown in FIG. 6, the peripheral device 602 includes security functionality 611 and target functionality 614, the system 600 can be operated so that only the security functionality 611 is used. The peripheral device 602 and peripheral device driver (discussed below) can be implemented so that, when the peripheral device 602 is operated in that way, the peripheral device identification data stored in the memory location 612*a* identifies the peripheral device 602 as a security device.

Returning to FIG. 5, after the peripheral device has established its identity, the host computing device identifies the peripheral device, as shown by step 504. This can be implemented as part of the host driver, as indicated above.

Once the host computing device has identified the peripheral device (and other host computing device operating system software operations concluded, if applicable), the user can begin using the peripheral device (in particular, the security functionality of the peripheral device), as shown by step 505 of the method 500. Such use can be enabled by one or more software programs (referred to collectively hereinafter as a "peripheral device driver," though such programs can include programs in addition to those conventionally termed "drivers," such as programs conventionally termed "applications") that are executed by the host computing device.

The use of a separate driver to control and interact with the security functionality of a peripheral device according to the invention can be advantageous because it reduces or eliminates the need to modify the host driver. As a practical matter, such modification of the host driver can likely only be accomplished by requiring a user to interact with a standard host driver to appropriately modify the standard host driver. This is undesirable because the user may forget to modify the driver or modify the driver incorrectly or incompletely.

The peripheral device driver can have previously been installed on a data storage device (e.g., hard disk) of the host computing device (in FIG. 6, the peripheral device driver is shown stored in the memory section 606b of the memory device 606 of the host computing device 601), or can be made accessible to the host computing device via an appropriate interface (such as a floppy disk drive, CD-ROM drive or network connection) at a time when the user wishes to initiate interaction between the host computing device and the peripheral device. Additionally, when a peripheral device according to the invention is used with a host computing device which utilizes operating system software that supports the feature informally referred to as "plug and play", it is also possible to store the peripheral device driver in a memory device of the peripheral device and configure the peripheral device so that, when the peripheral device is connected for the first time to a particular host computing device, the host computing device automatically provides the user with the opportunity to instruct the host computing device to cause the peripheral device driver to be transferred from the peripheral device to the host computing device.

Figure 7B:
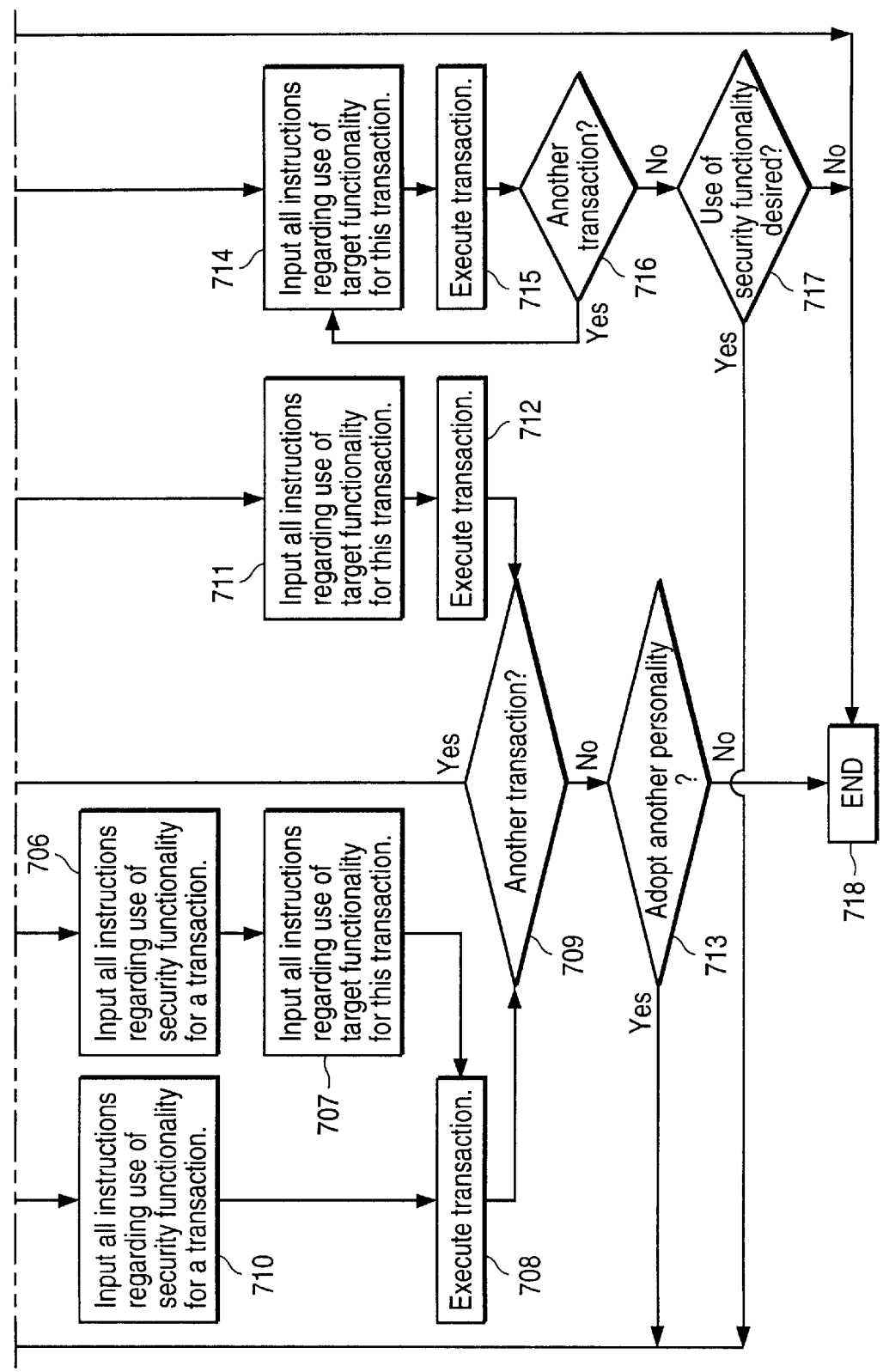

FIG. 7 is a flow chart of a method 700, according to an embodiment of the invention, for using a peripheral device according to the invention. It is to be understood that the method 700 shown in FIG. 7 is not the only way to enable the aspects of use of a peripheral device according to the invention that are illustrated in FIG. 7; as can be readily appreciated by those skilled in the art, such aspects can be implemented using any of a variety of other appropriate methods. Further, the use of a peripheral device according to the invention can include aspects not illustrated in FIG. 7; likewise, such use may not include some of the aspects illustrated in FIG. 7. The method 700 of FIG. 7 is shown merely to aid in the illustration of certain aspects of the invention, and should not be interpreted as restricting the manner in which a peripheral device according to the invention can be used.

To begin using a peripheral device according to the invention, a user instructs the host computing device to begin execution of the peripheral device driver, as shown by step 701 of the method 700, the user having obtained knowledge of the appropriate command to begin execution of the peripheral device driver in any appropriate manner (e.g., from a user manual accompanying the peripheral device driver and/or the peripheral device). In general, the steps of the method 700 occur as a result of operation of a peripheral device driver; however, operation of the host driver may be necessary or desirable to enable some aspects of the method 700 (e.g., execution of a transaction, as in steps 708, 712 and 715).

As indicated above, a peripheral device according to the invention can be implemented so that the host driver cannot detect the presence of the security functionality of the peripheral device. In such case, the peripheral device driver enables the detection of the security functionality, as shown by step 702 of the method 700. This can be accomplished by including instructions as part of the peripheral device driver that, when the peripheral device driver first begins executing, cause the peripheral device driver to access a predefined location of a memory device of the peripheral device (in FIG. 6, the memory section 612b) for data that identifies whether the peripheral device is a device having security functionality that is compatible with the peripheral device driver. If the peripheral device is such a device, then the peripheral device driver can enable the user to make use of the security functionality of the peripheral device. Further, the peripheral device driver can be implemented, as shown in FIG. 7, so that, if the proper security functionality is not detected, execution of the peripheral device driver terminates, preventing use of the peripheral device. Alternatively, the peripheral device driver can be implemented so that, if the proper security functionality is not detected, the target functionality of the peripheral device can be used without the security functionality of the peripheral device.

A peripheral device according to the invention can, in general, be operated in one of three modes: 1) a mode in which only the security functionality is used, 2) a mode in which both the security functionality and the target functionality are used, and 3) a mode in which only the target functionality is used. The user can be enabled to, via the peripheral device driver, select any one of the three modes of operation. However, in some applications, it may be desirable to inhibit operation in one or two of the modes. In particular, it may be desirable to prevent operation of the peripheral device in the last of the above-listed modes, i.e., a mode in which the security functionality is not used, if it is desired to ensure that use of the target functionality can only occur with the application of one or more security operations. This could be accomplished by implementing the peripheral device driver so that the option to operate in that mode is not presented to the user, or the peripheral device could be configured during manufacture to prohibit operation in that mode. For example, if the target functionality is embodied as a communications device or a memory device, it may be desirable to ensure that unencrypted data cannot be transferred via the communications device or stored in the memory device, whether done inadvertently or on purpose.

In the method 700, all three of the above-listed modes are available for use. In the step 703 of the method 700, a determination is made as to whether the security functionality is to be used. (As noted above, such use may be required.) If yes, the peripheral device is operated in one of the first two modes above (security functionality only, or security functionality plus peripheral functionality); if no, the third mode is used (peripheral functionality only).

The peripheral device driver can be implemented so that the user must successfully enter an acceptable access code (e.g., a password or PIN) before the user is enabled to use the peripheral device. In particular, it can be desirable to require an access code before enabling a user to use the security functionality, thus establishing a layer of security that protects the integrity of the security operations themselves. In the method 700, as shown by the step 704, an acceptable access code must be entered by the user before the security functionality of the peripheral device can be used. An access code can be entered, for example, by inputting the access code in a conventional manner using a user interface device (e.g., keyboard) of the host computing device. Or, an access code can be entered using particular embodiments of target functionality (such as a biometric device, discussed in more detail below) that is part of the peripheral device according to the invention.

Advantageously, an access code can be used not only to control access to the security (or other) functionality of the peripheral device, but also to identify a "personality" of the user. Each personality is represented by data that establishes certain characteristics of operation of the peripheral device, such as, for example, restrictions on operation of the peripheral device (e.g., limitations on the types of security operations that can be performed) or specification of operating parameters or characteristics (e.g., cryptographic keys or specification of a particular incarnation of a type of security algorithm, such as a particular encryption algorithm). A single user can have multiple personalities: each personality might, for example, correspond to a different capacity in which a user acts. Data representing personalities and corresponding user access codes can be stored in a memory device of the peripheral device.

Upon receipt of an acceptable access code, the peripheral device driver controls the host computing device to present a user interface that enables the user to effect desired control of the peripheral device, and, in particular, to use the peripheral device to perform security operations, as described below. (If access codes are also used to identify personalities, upon receipt of an acceptable access code, the peripheral device driver can also access and retrieve the data representing the corresponding personality, so that the operation of the peripheral device can be controlled accordingly.) The user interface for enabling a user to operate the peripheral device can be implemented in any of a variety of well known ways (e.g., as a graphical user interface) using methods and apparatus that are well known to those skilled in the art. Generally, the user interface enables the user to perform any functionality that is provided by the peripheral device, as described in more detail elsewhere herein.

As indicated above, a peripheral device according to the invention can be operated in any of three modes. Once an acceptable access code has been entered, the peripheral device driver can enable the user to select one of the three modes, as shown in step 705 of the method 700. (Alternatively, as mentioned above, it may be desirable to present the user only with the option of choosing the security functionality only mode or the security functionality plus peripheral functionality mode, so as to eliminate the possibility that the user will effect an unsecured use of the target functionality.) If the security functionality only mode, or the security functionality plus peripheral functionality mode, is selected, then the user interface (and the underlying peripheral device driver) enables the user to input all desired or required instructions regarding the security operations to be performed for a particular "transaction" (e.g., a storage of data in a memory device, a transmission of data by a communications device, or an exchange of data with a smart card reader device), as shown by steps 706 and 710 of the method 700. For example, the user interface can enable the user to select data to which security operations are to be performed, specify the application of particular security operations to data, or specify parameters or other information required for a particular security operation. If the security functionality plus peripheral functionality mode, or the peripheral functionality only mode, is selected, then the user interface and peripheral device driver enable the user to input all desired or required instructions regarding use of the target functionality for the transaction, as shown by steps 707 and 711 of the method 700. For example, if the target functionality is embodied as a memory device, the user interface can enable the user to specify a name for the stored data. Or, for example, if the target functionality is embodied as a communications device, the user interface can enable the user to specify a destination (e.g., an electronic mail address) for the data.

Once the user has provided instructions in steps 706 and 707, in step 710, or in step 711, the transaction is executed, as shown by step 708 or step 712 of the method 700. After execution of the transaction, the user can be allowed to execute further transactions, as shown by step 709 of the method 700. It is also possible for the user to begin using another personality (by entering an appropriate access code), as shown by step 709 of the method 700. Eventually, use of the peripheral device ends, as shown by step 718 of the method 700.

The peripheral device and associated peripheral device driver can be implemented so that it is possible to use only the security functionality of the peripheral device. The peripheral device can be used in this manner to, for example, encrypt or decrypt data stored on the host computing device by receiving the data from the host computing device, encrypting or decrypting the data as appropriate, then returning the encrypted or decrypted data to the host computing device.

As indicated above, the peripheral device and associated peripheral device driver can be implemented so that it is possible to use only the target functionality of the peripheral device, even without entering an appropriate access code. In the method 700, such operation is shown by the steps 714, 715 and 716, which function in the same manner as steps 711, 712 and 709, described above. Using the peripheral device in this way can be useful, for example, when the target functionality is embodied as a biometric device, as described further below, that is used to perform user authentication. In particular, if the biometric device is to be used as the mechanism to enter the access code in step 704, operation in this mode may be necessary (depending on the capabilities of the biometric device) to enable such use of the biometric device. (Of course, in this case, security functionality, i.e., user authentication, is used as part of the step 715) The step 717 can also enable use of the security functionality to begin by causing a prompt for an appropriate access code to appear (step 704). Again, eventually, use of the peripheral device ends (step 718).

As described above, a peripheral device according to the invention that includes security functionality and target functionality can be implemented so that the host computing device is not aware of the presence of the security functionality. It may also be desirable to shield the user from knowledge of the presence of the security functionality and cause predetermined security operations to be performed automatically. This may be desirable so that, for example, it is not necessary for the user to provide input regarding the performance of security operations, thus eliminating the possibility that the user will neglect to provide such input, or will provide the input incorrectly or incompletely. Or, it may be desirable to make security operations transparent to users to enhance the security of those operations, since, if the performance of such operations is unknown, there will be no attempt to defeat the security provided by those operations. If such is the case, the peripheral device driver can be implemented so that the peripheral device can operate only in the security functionality plus peripheral functionality mode (steps 710, 711, 712, 714, 715, 716 and 717 of the method 700 cannot be performed) and so that no indication (e.g., presentation of a user interface display that allows input of instructions regarding the performance of security operations, as in step 706 of the method 700) is given of the presence of the security functionality of the peripheral device. Rather, the user would simply be presented with options regarding operation of the target functionality (step 707 of the method 700). In such an implementation, the peripheral device driver can be implemented to automatically cause one or more predetermined security operations to be performed based upon a user-specified interaction with the target functionality, or the peripheral device can be configured to cause such security operations to be performed any time a specified interaction with the target functionality occurs.

A significant advantage of a peripheral device according to the invention is that the peripheral device can be implemented so that any of a variety of types of target functionality can be included as part of the peripheral device. In particular, as described in more detail below, the peripheral device includes an interface control device which enables and manages communications between and among the host computing device, a cryptographic processing device that is part of the peripheral device, and target functionality that is also part of the peripheral device. The interface control device can be adapted to provide an appropriate interface for each type of target functionality. Thus, in general, any desired target functionality can be used with a peripheral device according to the invention, so long as the target functionality is implemented so as to enable communication with an interface of the type presented. Those skilled in the art of data communications can readily understand how to implement such communication with target functionality in view of the detailed description below (see FIGS. 8, 9A and 9B) of an embodiment of a peripheral device according to the invention, and, in particular, an interface control device of such a peripheral device.

For example, target functionality of a peripheral device according to the invention can be embodied as a memory device adapted to enable non-volatile storage of data. In general, any such memory device can be used to embody such target functionality. More particularly, a solid-state disk storage device (e.g., NAN flash memory device) can advantageously be used. Illustratively, a memory device that can be used to embody target functionality in a peripheral device according to the invention can be a compact flash memory device, such as an ATA format flash disk drive. Other solid-state disk storage devices, such as SCSI disks and IDE disks can be used. The construction and operation of memory devices in general, as well as those identified particularly above, is well understood by those skilled in that art, so that, together with an understanding of the required communication capability between the target functionality and the interface control device, a memory device for use with the invention can be easily constructed and operated. A peripheral device according to the invention that includes a memory device that embodies the target functionality can be used, for example, to securely store data in a manner that enables a user of the data to easily carry the data with them wherever they go.

Target functionality of a peripheral device according to the invention can also be embodied as a communications device adapted to enable communication between the host computing device and a remote device. In general, any such communications device can be used to embody target functionality. A communications device that can be used to embody target functionality in a peripheral device according to the invention can include, for example, a data communications modem (such as, for example, a conventional telephone line modem, an ISDN modem, a cable modem, or a wireless modem) or a LAN transceiver (either wired or wireless and, in the latter case, operating in, for example, the infrared or radiofrequency spectrum). The construction and operation of communication devices in general, as well as those identified particularly above, is well understood by those skilled in that art, so that, together with an understanding of the required communication capability between the target functionality and the interface control device, a communication device for use with the invention can be easily constructed and operated. A peripheral device according to the invention that includes a communications device that embodies target functionality can be used, for example, to encrypt electronic mail before transmission to an addressee. Or, such a peripheral device can be used, for example, to encrypt data files that a person wishes to securely transfer between a computing device at the person's place of work and a computing device at the person's home.

Target functionality of a peripheral device according to the invention can also be embodied as a biometric device, which is defined herein as any device that is adapted to receive input data regarding a physical characteristic of a person based upon a physical interaction of the person with the device. In general, any such biometric device can be used to embody target functionality. Biometric devices that can be used in a peripheral device according to the invention can include, for example, a fingerprint scanning device, a retinal scanning device or a faceprint scanning device.

In addition to conventional computational devices for storing and/or manipulating digital data, a biometric device includes a sensor for sensing the physical characteristic, and an analog-to-digital converter to transform the analog data representing the sensed characteristic into digital data. For example, a fingerprint scanning device includes a sensor upon which a person can place a finger, the sensor sensing the fingerprint of the finger, the content of the sensed fingerprint being converted into digital data by the device. Similarly, a retinal scanning device includes a sensor which can be placed proximate to a person's eye, the sensor sensing characteristics of the eye such as blood vessel pattern or iris pattern, the device translating the content of the sensed characteristics into digital data. The construction and operation of biometric devices in general, as well as those identified particularly above, is well understood by those skilled in that art, so that, together with an understanding of the required communication capability between the target functionality and the interface control device, a biometric device for use with the invention can be easily constructed and operated. Fingerprint scanning devices and retinal scanning devices that can readily be modified for use with the invention, i.e. to communicate with an interface control device according to the invention, are known to those skilled in that art. For example, fingerprint scanning devices such as those available from Identix Incorporated of Sunnyvale, Calif. can be used in a fingerprint scanning device for use with the invention.

A peripheral device according to the invention that includes a biometric device that embodies the target functionality can be used, for example, to enable user authentication to a host computing device before allowing access to particular data stored on the host computing device. Such user authentication can be accomplished by using a biometric device to obtain biometric data from a user and comparing the biometric data to an appropriate library of biometric data representing a predetermined group of people (e.g., authorized users). The library of data can be stored in a memory device of the peripheral device.

When a peripheral device including a fingerprint scanning device is embodied as a card adapted to be inserted into a slot of a host computing device (e.g., a slot conforming to a PCMCIA standard), it may be useful to make the peripheral device relatively long, so that a portion of the card on which the sensor is positioned can extend from the slot of the host computing device, thereby enabling fingerprints to be scanned while the peripheral device is inserted in the host computing device. Similarly, for a fingerprint scanning device, retinal scanning device or faceprint scanning device, it may be desirable to form the device so that the sensor is connected to the remainder of the device via an appropriate communication line, thus providing some range of movement of the sensor while the peripheral device is inserted in the host computing device, thereby facilitating use of the device.

A biometric device can be used in different ways with a system according to the invention, depending upon the capabilities of the biometric device. Using known apparatus and methods, a "smart" biometric device can be implemented with the capability to detect the presence of an input to the sensor, and, upon such detection, initiate acquisition of the biometric data and performance by the peripheral device of the appropriate data comparison. Such a biometric device can be used to perform user authentication as in step 704 of the method 700 above. Alternatively, the biometric device may be "stupid" and require that a user initiate the data acquisition and authentication process. Such a biometric device can be used to perform user authentication in a peripheral device that allows operation without entry of a proper access code, as in steps 714 and 715 of the method 700.

Target functionality of a peripheral device according to the invention can also be embodied as a smart card reader device adapted to communicate with a smart card, such as, for example, a smart card compliant with the ISO 7816 standard. Such a device can be implemented by adapting a conventional smart card reader, the construction and operation of which is well known to those skilled in that art, to provide a communications interface that enables the smart card reader to communicate with the interface control device. A peripheral device according to the invention that includes a smart card reader device can be used to provide security features to a smart card reader, or add to existing security features of a smart card reader.

It is to be understood that the examples given above are merely illustrative, not exhaustive, of the ways in which a peripheral device according to the invention can be used. Many more possibilities exist.

Figure 8:
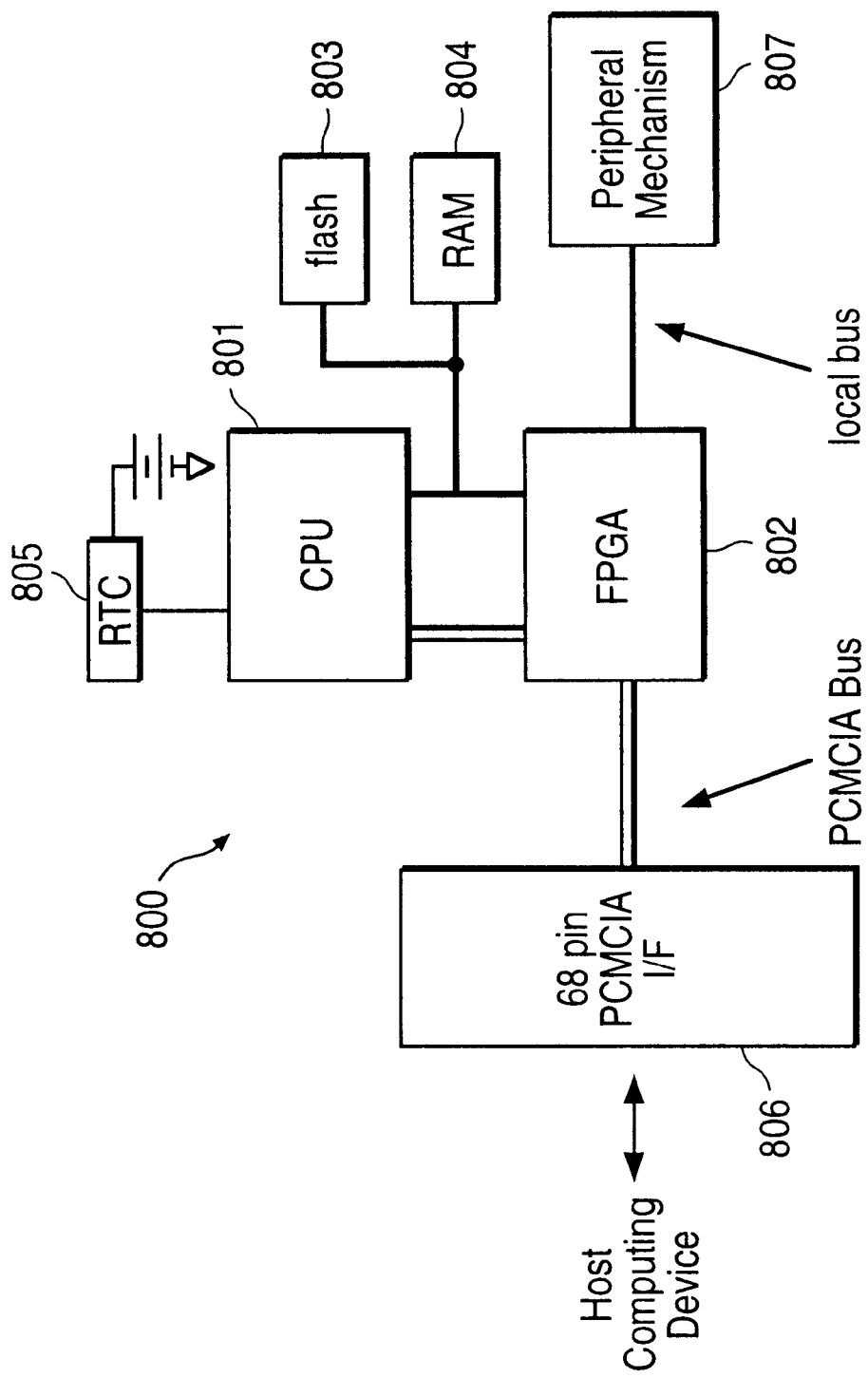
FIG. 8 is a block diagram of a peripheral device according to another embodiment of the invention.

FIG. 8 is a block diagram of a peripheral device 800 according to another embodiment of the invention. The peripheral device 800 includes a cryptographic processing device 801, an interface control device 802, a first memory device 803, a second memory device 804, a real-time clock 805, a host computing device input/output (I/O) interface 806 and target functionality 807.

The host computing device I/O interface 806 enables communications between the peripheral device 800 and a host computing device. The electrical and mechanical characteristics of the I/O interface 806, as well as the protocol used to enable communication via the interface 806 are established in any manner that conforms to the industry standard specifications for an interface of that type. For example, a peripheral device according to the invention can be adapted for insertion into a PCMCIA slot of a host computing device. In such a peripheral device, the electrical and mechanical characteristics and communications protocol for the host computing device I/O interface 806 are established in conformance with the appropriate PCMCIA standards.

The cryptographic processing device 801 can be adapted to perform security operations. Generally, the cryptographic processing device 801 can be embodied by any processor capable of performing the cryptographic operations desired to be provided by the peripheral device 800. In one embodiment of the peripheral device 800, the cryptographic processing device 801 is a special purpose embedded processor, embodied on a single integrated chip and designated as MYK-82 (and also referred to by the name Capstone), which includes an ARM6™ processor core and several special purpose cryptographic processing elements that have been developed by the Department of Defense. The construction and operation of the Capstone chip is known by those skilled in the art of cryptographic processing.

The first memory device 803 can be a non-volatile data storage device which can be used to store computer programs and persistent data. The first memory device 803 can be implemented by any appropriate such device (of which there are many conventional, readily available incarnations), such as, for example, a conventional flash memory device.

The second memory device 804 can be a volatile data storage device that can also be a rapidly accessible data storage device in which frequently used data and program instructions can be stored during operation of the peripheral device 800. The second memory device 804 can also be implemented by any appropriate such device (of which there are many conventional, readily available embodiments), such as, for example, a conventional random access memory (RAM) device.

The real-time clock 805 enables the creation of time stamps, which can be used in a number of security operations. Advantageously, the time stamps created by the real-time clock 805 are more secure than those that could otherwise be produced by the relatively insecure clock of a host computing device. The real-time clock 805 includes a conventional battery backup device that maintains power to the real-time clock 805 when the peripheral device 800 is not in use (i.e., when power is not supplied to the peripheral device 800), so that the correct time is continuously preserved within the peripheral device 800. The real-time clock 805 (including battery backup) can be embodied by any conventional such device, such as the DS1302 clock available from Dallas Semiconductor of Dallas, Texas.

In the peripheral device 800, the interface control device 802 mediates the interaction between the host computing device, the target functionality 807 and the cryptographic processing device 801. In one embodiment of the peripheral device 800, the interface control device 802 is a conventional field-programmable gate array (FPGA) that is programmed to perform the functions that it is desired to implement with the interface control device 802, as described in more detail below. The interface control device 802, under control of the cryptographic processing device 801, can be adapted to enable the peripheral device 800 to assume the identity of the target functionality 807, as discussed above. The interface control device 802 also enables the in-line cryptography aspect of the invention, since the interface control device 802 controls the flow of data between the host computing device and the target functionality 807.

Figure 9A:
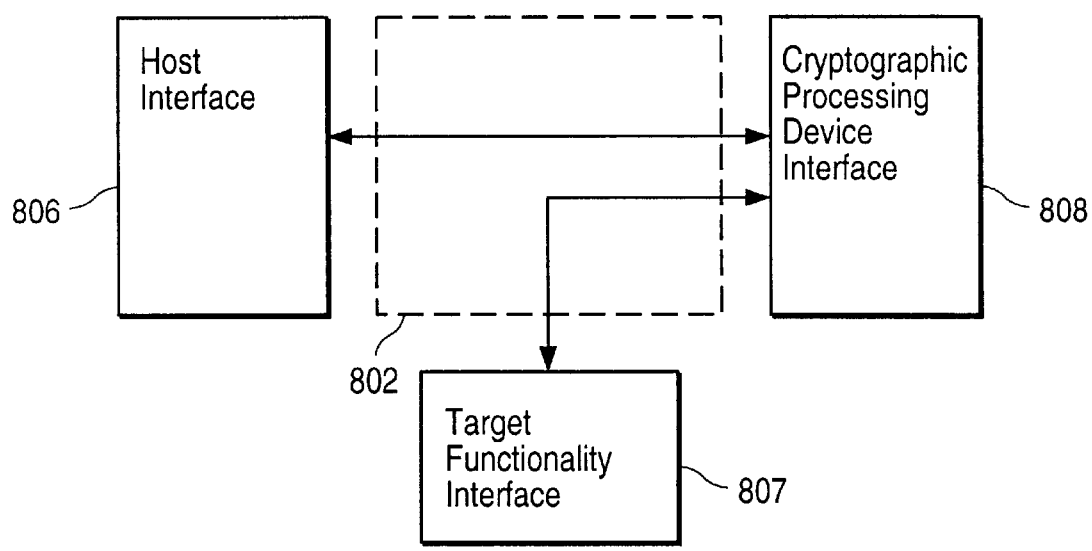
FIG. 9A is a block diagram illustrating the flow of data through the interface control device of FIG. 8.

FIG. 9A is a block diagram illustrating the flow of data through the interface control device 802 of FIG. 8. Data transferred from a host computing device enters the peripheral device 800 (not demarcated in FIG. 9A) through the host computing device I/O interface 806. The interface control device 802 presents the data to a cryptographic processing device interface 808 (not shown in FIG. 8). Depending on the configuration of the interface control device 802, as determined by operation of the peripheral device driver and/or by settings established during the manufacture of the peripheral device 800, the data may or may not be processed by the cryptographic processing device 801 (FIG. 8). Typically (or, in some cases, necessarily), as discussed in more detail above, cryptographic processing will occur. The interface control device 802 then causes the data to be transferred to the target functionality 807. Data being transferred from the target functionality 807 to the host computing device follows a similar path in the reverse direction. When the target functionality 807 is not present or is not being used, data transferred from the host computing device, after being presented to the cryptographic processing device interface 808 and being processed by the cryptographic processing device 801, is caused to be transferred back to the host computing device I/O interface 806 (and, from there, to the host computing device) by the interface control device 802.

Figure 9B:
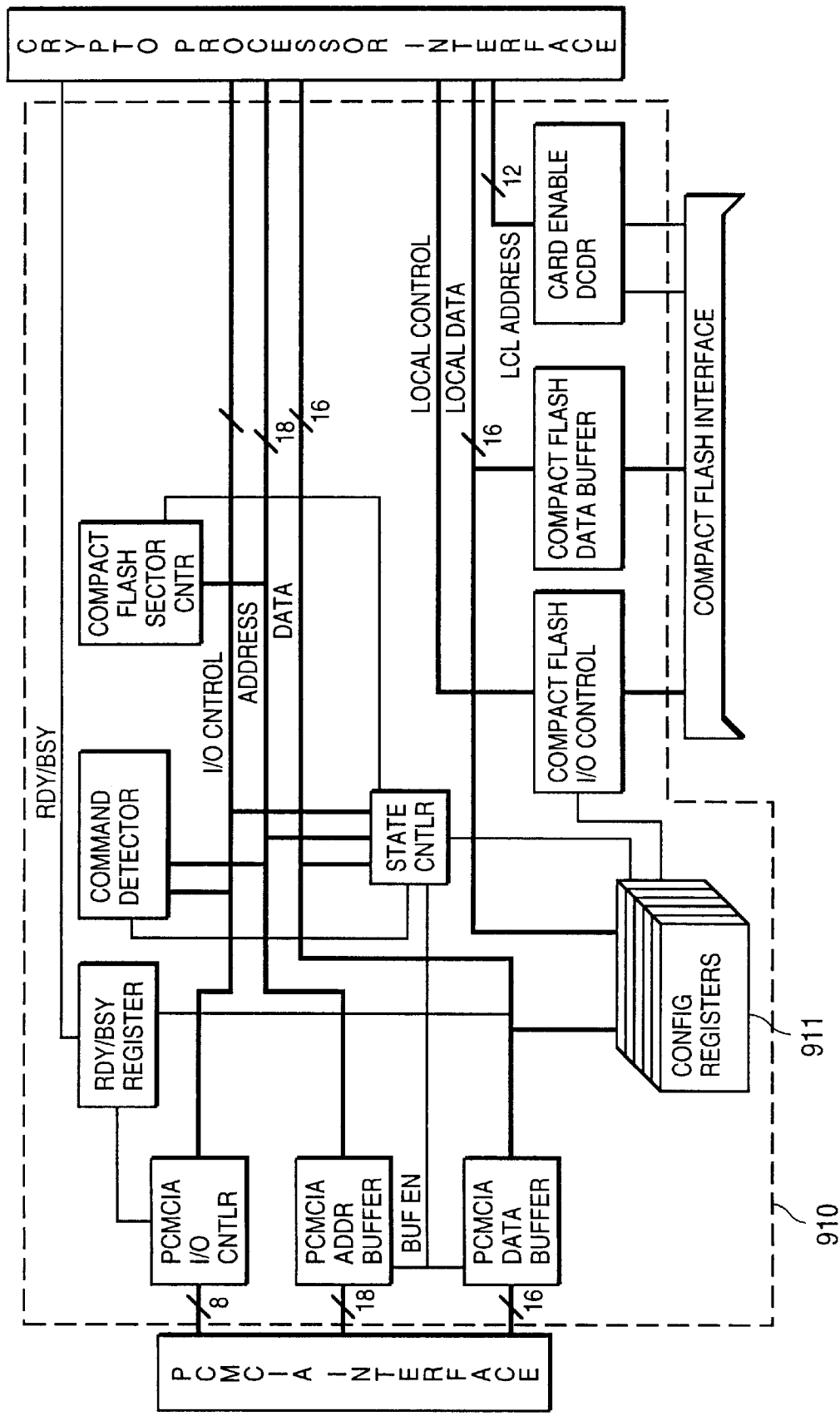
FIG. 9B is a block diagram of a particular embodiment of an interface control device for use in a peripheral device according to the invention.

FIG. 9B is a block diagram of a particular embodiment of an interface control device 910 for use in a peripheral device according to the invention. As shown in FIG. 9B, the host computing device communicates via a PCMCIA interface and the target functionality is embodied by a compact flash memory device. Those skilled in the art will readily appreciate how the interface control device 910 can be modified for use with other host computing device interfaces and/or target functionalities.

The interface control device 910 includes sets of configuration registers 911. The data stored in the configuration registers 911 establish operating characteristics of the interface control device: in particular, the content of the configuration registers enables the interface control device to present to the host computing device a desired identification of the peripheral device, and determines whether data passing through the peripheral device must be subjected to security operations.

A set of configuration registers is maintained for the host computing device I/O interface, the cryptographic processing device interface, and the target functionality interface. In particular, the content of the host computing device I/O interface configuration registers is such that the interaction of the host computing device with the peripheral device is the same as if the security functionality were not present (unless the data security system is operating in security functionality only mode). The content of the target functionality interface registers reflects the presence of the security functionality. The cryptographic processing device interface registers bridge the gap between the other two sets of registers.

The remainder of the functional blocks of the interface control device 910 shown in FIG. 9B perform functions and operate in a manner that can readily be understood by those skilled in the art from the designation and interconnection of those blocks in FIG. 9B.

In general, the security functionality of a peripheral device according to the invention can be configured to perform any cryptographic operation, as well as other, related mathematical operations. A configuration of the security functionality that enables a particular cryptographic or mathematical operation can be produced, for example, by using appropriate existing cryptographic software, application-specific hardware, or combination of the two, as known by those skilled in the art of producing cryptographic devices. Following is a description of exemplary cryptographic and mathematical operations that can be implemented as part of the security functionality of a peripheral device according to the invention. These cryptographic and mathematical operations are well-known and can readily be implemented in a peripheral device according to the invention by a person of skill in the art of cryptography.

For example, a peripheral device according to the invention can implement one or more cryptographic key exchange operations. Any key exchange operation can be implemented, such as, for example, the Department of Defense Standard, the RSA, the Diffie-Hellman, and the X9.42 (ANSI Banking Standard) key exchange algorithms.

A peripheral device according to the invention can also implement one or more hash operations. Any hash operation can be implemented, such as, for example, the FIPS 180-1 (SHA-1), the Message Digest 2 (RSA), and the Message Digest 5 (RSA) algorithms.

A peripheral device according to the invention can also implement one or more digital signature operations. Any digital signature operation can be implemented, such as, for example, the FIPS 186 (DSA—512, 1024) and the RSA Signature (512, 768, 1024, 2048) algorithms.

A peripheral device according to the invention can also implement one or more key wrapping operations for both symmetric and asymmetric keys. A key wrapping operation can ensure that plaintext keys are not accessible external to the peripheral device. Any key wrapping operation can be implemented.

A peripheral device according to the invention can also implement one or more symmetric encryption operations. Any symmetric encryption operation can be implemented, such as, for example, the FIPS 185 (implemented completely in hardware), the DES (including 3DES, EDE3, CBC and ECB), the RC-2 and the RC-4 algorithms.

A peripheral device according to the invention can also implement one or more asymmetric (public key) encryption operations. While asymmetric encryption operations underlie the key exchange operations described above, asymmetric key operations can also be used independently in a peripheral device according to the invention for bulk encryption. Any asymmetric encryption operation can be implemented, such as, for example, the RSA and Diffie-Hellman algorithms.

A peripheral device according to the invention can also implement one or more exponentiation operations, which are required in many cryptographic operations. Any exponentiation operation can be implemented. Since exponentiation requires a significant amount of processing time relative to other mathematical operations, it can be desirable to implement an exponentiation operation in dedicated hardware. In one embodiment of a peripheral device according to the invention, the security functionality of the peripheral device includes a full 1024 bit exponentiator implemented in hardware.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:

1. A peripheral device, comprising:

security means for enabling one or more security operations to be performed on data;

target means for enabling a defined interaction with a host computing device;

means for enabling communication between the security means and the target means;

means for enabling communication with a host computing device;

means for operably connecting the security means and/or the target means to the host computing device in response to an instruction from the host computing device; and means for mediating communication of data between the host computing device and the target means so that the communicated data must first pass through the security means.

2. A peripheral device as in claim 1, wherein the target means comprises means for non-volatilely storing data.

3. A peripheral device as in claim 1, wherein the target means comprises means for enabling communication between the host computing device and a remote device.

4. A peripheral device as in claim 1, wherein the target means comprises a biometric device.

5. A peripheral device as in claim 1, wherein the target means comprises means for communicating with a smart card.

6. A peripheral device, comprising:
   security means for enabling one or more security operations to be performed on data;
   target means for enabling a defined interaction with a host computing device;
   means for enabling communication between the security means and the target means,
   means for enabling communication with a host computing device;
   means for operably connecting the security means and/or the target means to the host computing device in response to an instruction from the host computing device; and
   means for providing to a host computing device, in response to a request from the host computing device for information regarding the type of the peripheral device, information regarding the function of the target means.

7. A peripheral device as in claim 6, wherein the target means comprises means for non-volatilely storing data.

8. A peripheral device as in claim 6, wherein the target means comprises means for enabling communication between the host computing device and a remote device.

9. A peripheral device as in claim 6, wherein the target means comprises a biometric device.

10. A peripheral device as in claim 6, wherein the target means comprises means for communicating with a smart card.

11. A peripheral device, comprising:
    security means for enabling one or more security operations to be performed on data;
    target means for enabling a defined interaction with a host computing device;
    means for enabling communication between the security means and the target means;
    means for enabling communication with a host computing device; and
    means for mediating communication of data between the host computing device and the target means so that the communicated data must first pass through the security means.

12. A peripheral device as in claim 11, wherein the target means comprises means for non-volatilely storing data.

13. A peripheral device as in claim 12, wherein the means for non-volatilely storing data further comprises a solid-state disk storage device.

14. A peripheral device as in claim 13, wherein the solid-state disk storage device comprises an ATA format flash disk drive.

15. A peripheral device as in claim 11, wherein the target means comprises means for enabling communication between the host computing device and a remote device.

16. A peripheral device as in claim 15, wherein the means for enabling communication between the host computing device and a remote device further comprises wireless communication means.

17. A peripheral device as in claim 16, wherein the wireless communication means comprises a wireless modem.

18. A peripheral device as in claim 16, wherein the wireless communication means comprises a wireless LAN transceiver.

19. A peripheral device as in claim 11, wherein the target means comprises a biometric device.

20. A peripheral device as in claim 19, wherein the biometric device comprises a fingerprint scanning device.

21. A peripheral device as in claim 19, wherein the biometric device comprises a retinal scanning device.

22. A peripheral device as in claim 11, wherein the target means comprises means for communicating with a smart card.

23. A peripheral device, comprising:
    security means for enabling one or more security operations to be performed on data;
    target means for enabling a defined interaction with a host computing device;
    means for enabling communication between the security means and the target means;
    means for enabling communication with a host computing device;
    means for mediating communication of data between the host computing device and the target means so that the communicated data must first pass through the security means; and
    means for providing to a host computing device, in response to a request from the host computing device for information regarding the type of the peripheral device, information regarding the function of the target means.

24. A peripheral device, comprising:
    security means for enabling one or more security operations to be performed on data;
    target means for enabling a defined interaction with a host computing device;
    means for enabling communication between the security means and the target means;
    means for enabling communication with a host computing device; and
    means for providing to a host computing device, in response to a request from the host computing device for information regarding the type of the peripheral device, information regarding the function of the target.

25. A peripheral device as in claim 24, wherein the target means comprises means for non-volatilely storing data.

26. A peripheral device as in claim 25, wherein the means for non-volatilely storing data further comprises a solid-state disk storage device.

27. A peripheral device as in claim 26, wherein the solid-state disk storage device comprises an ATA format flash disk drive.

28. A peripheral device as in claim 24, wherein the target means comprises means for enabling communication between the host computing device and a remote device.

29. A peripheral device as in claim 28, wherein the means for enabling communication between the host computing device and a remote device further comprises wireless communication means.

30. A peripheral device as in claim 29, wherein the wireless communication means comprises a wireless modem.

31. A peripheral device as in claim 29, wherein the wireless communication means comprises a wireless LAN transceiver.

32. A peripheral device as in claim 24, wherein the target means comprises a biometric device.

33. A peripheral device as in claim 32, wherein the biometric device comprises a fingerprint scanning device.

34. A peripheral device as in claim 32, wherein the biometric device comprises a retinal scanning device.

35. A peripheral device as in claim 24, wherein the target means comprises means for communicating with a smart card.

36. A data security system, comprising:

a host computing device including one or more device interfaces adapted to enable communication with another device;

a peripheral device, comprising:

security means for enabling one or more security operations to be performed on data;

target means for enabling a defined interaction with a host computing device; and means for enabling communication between the security means and the target means;

means for enabling communication with a host computing device; and means for mediating communication of data between the host computing device and the target means so that the communicated data must first pass through the security means.

37. A data security system, comprising:

a host computing device including one or more device interfaces adapted to enable communication with another device;

a peripheral device, comprising:

security means for enabling one or more security operations to be performed on data;

target means for enabling a defined interaction with a host computing device; and means for enabling communication between the security means and the target means;

means for enabling communication with a host computing device; and means for providing to a host computing device, in response to a request from the host computing device for information regarding the type of the peripheral device, information regarding the function of the target means.

38. For use in a peripheral device adapted for communication with a host computing device, performance of one or more security operations on data, and interaction with a host computing device in a defined way, a method comprising the steps of:

receiving a request from a host computing device for information regarding the type of the peripheral device; and providing to the host computing device, in response to the request, information regarding the type of the defined interaction.

39. For use in a peripheral device adapted for communication with a host computing device, performance of one or more security operations on data, and interaction with a host computing device in a defined way, a method comprising the steps of:

communicating with the host computing device to exchange data between the host computing device and the peripheral device;

performing one or more security operations and the defined interaction on the exchanged data; and mediating communication of the exchanged data between the host computing device and the peripheral device so that the exchanged data must first sass through means for performing the one or more security operations.

* * * * *